US009800700B2

(12) United States Patent
Kwon et al.

(10) Patent No.: US 9,800,700 B2
(45) Date of Patent: Oct. 24, 2017

(54) ELECTRONIC DEVICE INCLUDING SCREEN

(71) Applicant: Samsung Electronics Co., Ltd., Gyeonggi-do (KR)

(72) Inventors: Hyok-Soo Kwon, Gyeonggi-do (KR); Sang-In Baek, Gyeonggi-do (KR); Sun-Keun Cho, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/734,344

(22) Filed: Jun. 9, 2015

(65) Prior Publication Data

US 2015/0365508 A1    Dec. 17, 2015

(30) Foreign Application Priority Data

Jun. 13, 2014  (KR) ........................ 10-2014-0072219

(51) Int. Cl.
| | |
|---|---|
| *H04B 1/38* | (2015.01) |
| *H04M 1/02* | (2006.01) |
| *G06F 1/16* | (2006.01) |
| *H04B 1/3888* | (2015.01) |
| *H04M 1/23* | (2006.01) |

(52) U.S. Cl.
CPC ........ *H04M 1/0266* (2013.01); *G06F 1/1626* (2013.01); *G06F 1/1635* (2013.01); *H04B 1/3888* (2013.01); *H04M 1/0262* (2013.01); *H04M 1/0277* (2013.01); *H04M 1/23* (2013.01)

(58) Field of Classification Search
CPC .... G06F 1/1616; G06F 3/1438; G06F 3/1446; G06F 1/16; G06F 1/1618; G06F 1/1647; G06F 1/1649; G06F 3/0481; G06F 3/0482; G06F 3/04845; G06F 3/0486; G06F 3/0488; G06F 3/04883; G06F 3/1423; G06F 17/30274
USPC ................................................. 345/174, 774
See application file for complete search history.

(56) References Cited

U.S. PATENT DOCUMENTS

| | | | | |
|---|---|---|---|---|
| 2,736,016 | A * | 2/1956 | Marlowe ................. | G09F 11/28 318/602 |
| 3,121,960 | A * | 2/1964 | Uttal ....................... | G09B 5/06 434/314 |
| 3,176,221 | A * | 3/1965 | Stamler ................... | F17C 13/02 324/130 |
| 3,441,675 | A * | 4/1969 | Marty ...................... | H04Q 3/42 379/286 |
| 3,495,088 | A * | 2/1970 | Kohashi ................. | H05B 33/08 250/214 LA |

(Continued)

FOREIGN PATENT DOCUMENTS

| | | |
|---|---|---|
| KR | 10-2006-0117078 A | 11/2006 |
| KR | 10-2008-0001362 A | 1/2008 |

(Continued)

*Primary Examiner* — Edward Urban
*Assistant Examiner* — Max Mathew
(74) *Attorney, Agent, or Firm* — Cha & Reiter, LLC

(57) ABSTRACT

An electronic device may include a housing including an upper opening part, a flat panel display set arranged in the upper opening part and including a screen, and a circuit board arranged under the flat type display set and coupled to an inner surface of the housing.

14 Claims, 11 Drawing Sheets

(56) References Cited

U.S. PATENT DOCUMENTS

| | | | | |
|---|---|---|---|---|
| 3,506,963 | A * | 4/1970 | Dohler | G06K 9/20 178/15 |
| 4,584,048 | A * | 4/1986 | Hamisch, Jr. | B65C 11/0242 101/288 |
| 4,670,752 | A * | 6/1987 | Marcoux | G09G 5/14 715/790 |
| 5,774,115 | A * | 6/1998 | Jaeger | G02F 1/13306 341/23 |
| 5,799,432 | A * | 9/1998 | Wright, Sr. | F41A 9/62 42/1.02 |
| 8,917,506 | B2 * | 12/2014 | Diebel | G06F 1/1628 361/679.41 |
| 9,229,675 | B2 * | 1/2016 | Becze | G06F 3/1438 |
| 9,313,305 | B1 * | 4/2016 | Diebel | G03B 17/02 |
| 9,477,265 | B2 * | 10/2016 | Kim | G06F 1/1601 |
| 2007/0029070 | A1 * | 2/2007 | Yamamoto | F04B 43/021 165/104.28 |
| 2010/0061040 | A1 | 3/2010 | Dabov et al. | |
| 2011/0186345 | A1 * | 8/2011 | Pakula | G06F 1/1626 174/520 |
| 2013/0062521 | A1 * | 3/2013 | Hirayama | G02F 1/13338 250/338.1 |
| 2014/0017521 | A1 * | 1/2014 | Suzuki | H01M 2/1077 429/7 |
| 2014/0165379 | A1 * | 6/2014 | Diebel | G06F 1/1628 29/592.1 |
| 2016/0029511 | A1 * | 1/2016 | Jung | F28F 23/00 361/700 |
| 2016/0084605 | A1 * | 3/2016 | Monti | A63F 13/837 463/2 |
| 2016/0153649 | A1 * | 6/2016 | Wilcox | F21S 2/005 362/234 |
| 2016/0179139 | A1 * | 6/2016 | Ahn | G06F 1/1686 361/679.3 |

FOREIGN PATENT DOCUMENTS

| | | |
|---|---|---|
| KR | 10-2013-0019133 A | 2/2013 |
| KR | 10-2013-0062710 A | 6/2013 |

\* cited by examiner

ELECTRONIC DEVICE INCLUDING SCREEN

CLAIM OF PRIORITY

This application claims the benefit under 35 U.S.C. §119(a) of a Korean Patent Application filed on Jun. 13, 2014 in the Korean Intellectual Property Office and assigned Serial No. 10-2014-0072219, the entire disclosure of which is hereby incorporated by reference.

TECHNICAL FIELD

The present disclosure generally relates to an electronic device including a screen, and more particularly to an electronic device having a relatively slim width or thickness.

BACKGROUND

At present, owing to the growth of electronic communication industries, user devices (e.g., smart phones, tablet computers, and the like) are becoming necessities to modern society while being becoming significant means for delivery of quickly changing information. These user devices utilize a Graphical User Interface (GUI) environment using a touch screen, and provide various multimedia based on a web environment.

Various electronic components may be coupled or mounted in order to provide various functions. For example, the user devices may mount stereo speaker modules to provide functions of music listening using stereo sound. As another example, the user devices may mount camera modules to provide functions of photographing. Or, the user devices may mount communication modules to provide functions of communication with other electronic devices through a network. Also, the user devices may provide various screens for information display.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure address at least the above-mentioned problems and/or disadvantages and to provide at least the advantages described below. An aspect of the present disclosure may be to reduce the thickness of an electronic device such that the device is relatively slim.

Another aspect of the present disclosure may be to improve coupling among a display set, a circuit board and a device case.

In accordance with an aspect of the present disclosure, an electronic device may include a housing including an upper opening part, a flat panel display set, which may include a touch sensing panel. The flat panel display set may be arranged in the upper opening part and including a screen, and a circuit board arranged under the flat type display set, and coupled to an inner surface of the housing.

At least a portion of the circuit board may be separated a distance from the plate panel display set. The flat panel display set may include a non-display area arranged around the screen and a through-hole arranged in the non-display area. An edge of the flat panel display set may be attached to an edge of the upper opening part of the housing. The button body may be coupled to the housing together with the circuit board. The device may further include a bolt that is inserted through bolt holes of the button body and the circuit board. The button body may be integrally shaped to comprise a shape part for elastically supporting the press button.

The circuit board may further comprise a socket arranged in a lower surface thereof, and the socket may be oriented perpendicularly with respect to the button body. The housing may further comprise a through-hole, and a plug insertion part of the socket may be opened to an exterior of the device via the through-hole. The circuit board may also comprise a flat panel shield can that is arranged in a lower surface of the circuit board. The flat panel shield can may shield electronic noises.

The housing may further comprise a receiver oriented perpendicularly with respect to the through-hole of the flat panel display set and the circuit board may comprise a shape that omits an area between the through-hole of the flat panel display set and the receiver. The housing may further comprise a space for fitting a partial edge area of the circuit board, and a catching jaw that secures the partial edge area of the circuit board within the space. The housing may also include a through-hole and the plug insertion part of the socket may be open to an exterior of the device via the through-hole. The housing may also include a lower opening part facing the upper opening part, and a battery pack may be arranged in the lower opening part. A cover may cover the lower opening part.

An electronic device may include a housing comprising an upper opening part; a flat panel display set arranged in the upper opening part and comprising a screen; a circuit board arranged under the flat type display set and coupled to an inner surface of the housing; and a button body arranged between the flat panel display set and the circuit board and coupled to the housing together with the circuit board using a bolt connection method. The flat panel display set may include a non-display area arranged around the screen and a through-hole arranged in the non-display area. The button body may include a press button being arranged in the through-hole of the flat panel display set and being integrally shaped to comprise a shape part for elastically supporting the press button. The housing may include a space for fitting a partial edge area of the circuit board, and a catching jaw for securing the partial edge area of the circuit board within the space.

Other aspects, advantages, and salient features of the disclosure will become apparent to those skilled in the art from the following detailed description, which taken in conjunction with the annexed drawings, discloses various embodiments of the present disclosure.

BRIEF DESCRIPTION OF THE DRAWINGS

The above and other aspects, features and advantages of certain embodiments of the present disclosure will become more apparent from the following detailed description when taken in conjunction with the accompanying drawings in which.

Throughout the drawings, it should be noted that like reference numbers are used to depict the same or similar elements, features, and structures.

DETAILED DESCRIPTION

Figure 1:
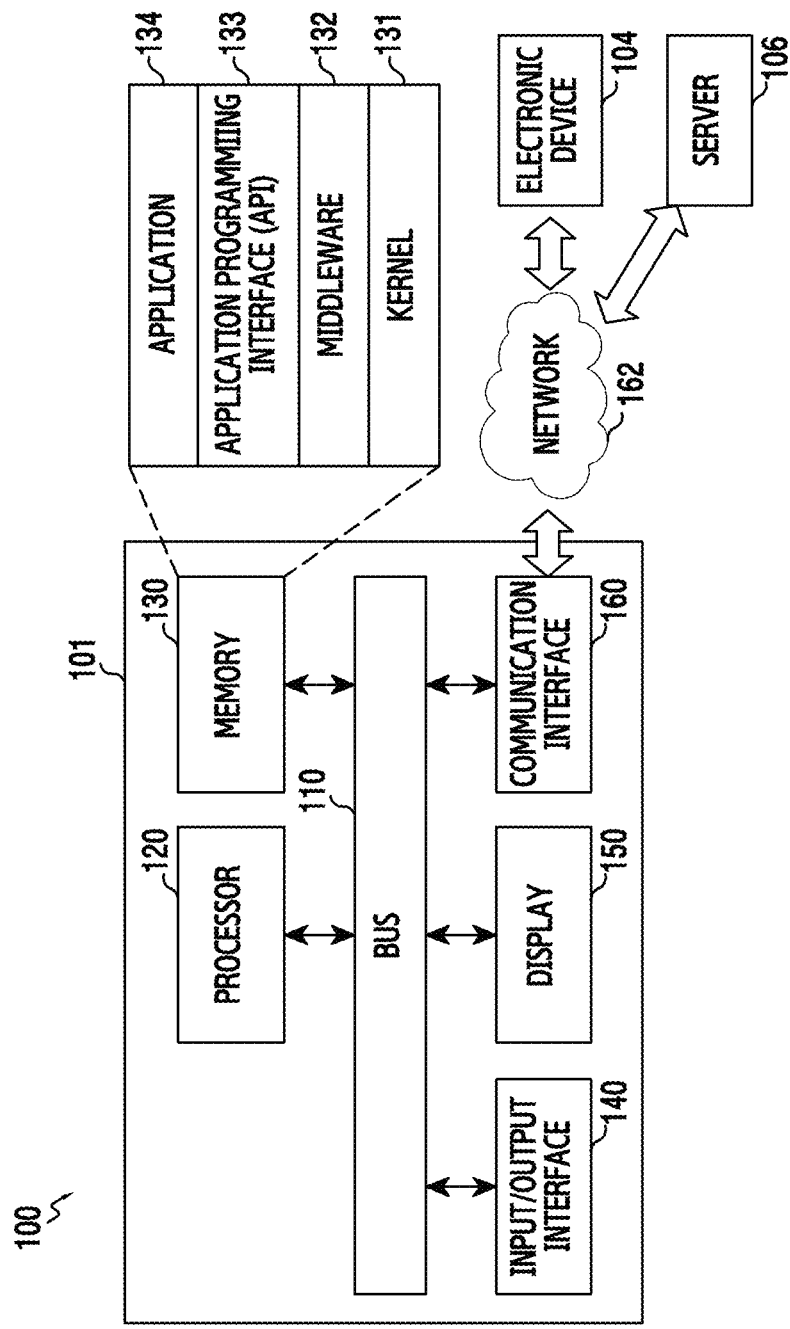
FIG. 1 illustrates a network environment including an electronic device according to one exemplary embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions "comprise", "may comprise", "include", "may include" or the like usable in one exemplary embodiment of the present disclosure indicate the existence of disclosed corresponding functions, operations, constituent elements or the like, and do not limit additional one or more functions, operations, constituent elements or the like. Also, in one exemplary embodiment of the present disclosure, the terms "comprise", "have" or the like are to designate the existence of features stated in the specification, numerals, steps, operations, constituent elements, components, or a combination thereof, and it should be understood that the terms "comprise", "have" or the like do not exclude the possibility of existence or addition of one or more other features, numerals, steps, operations, constituent elements, components, or combinations thereof.

Expressions such as "or" and the like include any and all combinations of words enumerated together. For example, "A or B" may include A, or may include B, or may include both A and B.

The expressions "first", "second" or the like may modify various constituent elements of one exemplary embodiment of the present disclosure, but do not intend to limit the corresponding constituent elements. For example, the expressions do not limit the order and/or importance and the like of the corresponding constituent elements. The expressions may be used to distinguish one constituent element from another constituent element. For example, all of a first user device and a second user device are user devices, and represent different user devices. For example, a first constituent element may be named as a second constituent element without departing from the scope of right of one exemplary embodiment of the present disclosure. Likewise, even a second constituent element may be named as a first constituent element.

When it is mentioned that any constituent element is "connected" or "accessed" another constituent element, the any constituent element may be directly connected or accessed to the other constituent element, but it should be understood that new other constituent element may also exist between the any constituent element and the other constituent element. In contrast, when it is mentioned that any constituent element is "directly connected" or "directly accessed" to other constituent element, it should be understood that no new other constituent element exists between the any constituent element and the other constituent element.

The terms used in one exemplary embodiment of the present disclosure are used for just describing specific exemplary embodiments, and do not intend to limit one exemplary embodiment of the present disclosure. The expression of a singular number includes the expression of plural number unless the context clearly dictates otherwise.

Unless defined otherwise, all the terms used herein including the technological or scientific terms have the same meaning as those commonly understood by a person having ordinary knowledge in the art which one exemplary embodiment of the present disclosure belongs to. The terms as defined in a general dictionary should be interpreted as having the same meanings as the contextual meanings of a related technology, and are not interpreted as having ideal or excessively formal meanings unless defined clearly in one exemplary embodiment of the present disclosure.

An electronic device according to one exemplary embodiment of the present disclosure may be a device including a telecommunication function. For example, the electronic device may include at least one of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MPEG Audio Layer 3 (MP3) player, a mobile medical instrument, a camera, or a wearable device (e.g., a Head Mounted Display (HMD) such as electronic glasses, electronic clothes, an electronic bracelet, an electronic necklace, an appcessory, an electronic tattoo, or a smart watch).

According to various embodiments, the electronic device may be a smart home appliance having a telecommunication function. The smart home appliance, for example, the electronic device may include at least one of a television, a Digital Video Disc (DVD) player, an audio system, a refrigerator, an air conditioner, a cleaner, an oven, a microwave, a washing machine, an air cleaner, a set-top box, a TV box (for example, Samsung HomeSync™, Apple TV™, or Google TV™), a game console, an electronic dictionary, an electronic locking system, a camcorder, or an electronic frame.

According to various embodiments, the electronic device may include at least one of various medical instruments (e.g., Magnetic Resonance Angiography (MRA), Magnetic Resonance Imaging (MRI), Computerized Tomography (CT), a moving-camera, an ultrasonic machine and the like), a navigation device, a Global Positioning System (GPS) receiver, an Event Data Recorder (EDR), a Flight Data Recorder (FDR), a car infotainment device, an electronic equipment for ship (e.g., a navigation device for ship, a gyrocompass and the like), avionics, a security instrument, a head unit for car, an industrial or home robot, an Automatic Teller Machine (ATM) of a financial institution, or a Point Of Sales (POS) of a shop.

According to various embodiments, the electronic device may include at least one of a part of furniture or building/structure including a telecommunication function, an electronic board, an electronic signature receiving device, a projector, or various metering instruments (e.g., tap water, electricity, gas, radio wave metering instrument or the like). The electronic device according to one exemplary embodiment of the present disclosure may be one of the aforementioned various devices or a combination of two or more of them. Also, the electronic device according to one exemplary embodiment of the present disclosure may be a flexible device. Also, it is obvious to those skilled in the art that the electronic device according to one exemplary embodiment of the present disclosure is not limited to the aforementioned instruments.

Below, an electronic device according to various embodiments will be described with reference to the accompanying drawings. The term 'user' used in the various embodiments may denote a person who uses the electronic device or a device (e.g., an artificial intelligent electronic device), which uses the electronic device.

FIG. 1 illustrates a network environment 100 including an electronic device 101 according to one exemplary embodiment of the present disclosure.

Referring to FIG. 1, the electronic device 101 may include a bus 110, a processor 120, a memory 130, an input/output interface 140, a display 150, and a communication interface 160.

The bus 110 may be a circuit connecting the aforementioned constituent elements with one another and forwarding communication (e.g., a control message) between the aforementioned constituent elements.

The processor 120 may, for example, receive instructions from the aforementioned other constituent elements (e.g., the memory 130, the input/output interface 140, the display 150, the communication interface 160 and the like) through the bus 110, and decipher the received instructions, and execute operation or data processing according to the deciphered instructions.

The memory 130 may store an instruction or data that is received from the processor 120 or the other constituent elements (e.g., the input/output interface 140, the display 150, the communication interface 160 and the like) or is generated by the processor 120 or the other constituent elements. The memory 130 may, for example, include programming modules such as a kernel 131, a middleware 132, an Application Programming Interface (API) 133, an application 134 or the like. The aforementioned programming modules each may be comprised of software, firmware, hardware or a combination of at least two or more of them.

The kernel 131 may control or manage system resources (e.g., the bus 110, the processor 120, the memory 130 or the like) used for executing operations or functions implemented in the remnant other programming modules, for example, the middleware 132, the API 133, or the application 134. Also, the kernel 131 may provide an interface enabling the middleware 132, the API 133, or the application 134 to connect and control or manage the individual constituent element of the electronic device 101.

The middleware 132 may perform a relay role of enabling the API 133 or the application 134 to communicate and exchange data with the kernel 131. Also, in relation to work requests received from the application 134, the middleware 132 may, for example, perform control (e.g., scheduling or load balancing) for the work requests using a method of allocating at least one application among the applications 134 priority order capable of using the system resources (e.g., the bus 110, the processor 120, the memory 130 or the like) of the electronic device 101.

The API 133 is an interface enabling the application 134 to control a function provided by the kernel 131 or the middleware 132. The API 133 may, for example, include at least one interface or function (e.g., an instruction) for file control, window control, picture processing, character control or the like.

According to various exemplary embodiments, the application 134 may include a Short Message Service (SMS)/Multimedia Message Service (MMS) application, an electronic mail (e-mail) application, a calendar application, an alarm application, a health care application (e.g., an application measuring momentum, blood sugar or the like), environment information application (e.g., an application providing air pressure, humidity, temperature information or the like) or the like. Additionally or alternatively, the application 134 may be an application related with information exchange between the electronic device 101 and an external electronic device (e.g., an electronic device 104). The application related with the information exchange may include, for example, a notification relay application for relaying specific information to the external electronic device, or a device management application for managing the external electronic device.

For example, the notification relay application may include a function of relaying to the external electronic device (e.g., the electronic device 104) notification information generated in other applications (e.g., the SMS/MMS application, the e-mail application, the health care application, the environment information application or the like) of the electronic device 101. Additionally or alternatively, the notification relay application may, for example, receive notification information from the external electronic device (e.g., the electronic device 104) and provide the received notification information to a user. The device management application may, for example, manage (e.g., install, delete or update) a function (e.g., turn-on/turn-off of the external electronic device itself (or some constituent components), or adjustment of a brightness (or resolution) of a display) of at least a part of the external electronic device (e.g., the electronic device 104) communicating with the electronic device 101, an application operating in the external electronic device, or a service (e.g., a telephony service or a message service) provided in the external electronic device.

According to one exemplary embodiment, the application 134 may include an application designated according to an attribute (e.g., the kind of electronic device) of the external electronic device (e.g., the electronic device 104). For example, when the external electronic device is an MP3 player, the application 134 may include an application related with music playback. Similarly, when the external electronic device is a mobile medical instrument, the application 134 may include an application related with health care. According to one exemplary embodiment, the application 134 may include at least one of an application designated to the electronic device 101 or an application received from the external electronic device (e.g., the server 106 or the electronic device 104).

The input/output interface 140 may forward an instruction or data, which is inputted from a user through an input/output device (e.g., a sensor, a keyboard or a touch screen), for example, to the processor 120, the memory 130 and the communication interface 160 through the bus 110. For example, the input/output interface 140 may provide data about a user's touch inputted through the touch screen, to the processor 120. Also, the input/output interface 140 may, for example, output through an input/output device (e.g., a speaker or a display) an instruction or data, which is received from the processor 120, the memory 130 and the communication interface 160 through the bus 110. For example, the input/output interface 140 may output voice data, which is processed through the processor 120, to the user through the speaker.

The display 150 may display various information (e.g., multimedia data, text data, or the like) to a user.

The communication interface 160 may connect communication between the electronic device 101 and the external device (e.g., the electronic device 104 or the server 106). For example, the communication interface 160 may be connected to a network 162 through wireless communication or wired communication, and communicate with an external device. The wireless communication may, for example, include at least one of Wireless Fidelity (WiFi), Bluetooth (BT), NFC, GPS or cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM) or the like). The wired communication may include at least one of a Universe Serial Bus (USB), a High Definition Multimedia Interface (HDMI), a Recommended Standard 232 (RS-232), or a Plain Old Telephone Service (POTS).

According to one embodiment, the network 162 may be a telecommunications network. The telecommunications network may include at least one of a computer network, the Internet, internet of things, or a telephone network. According to one exemplary embodiment, a protocol (e.g., a transport layer protocol, a data link layer protocol, or a physical layer protocol) for communication between the electronic device 101 and an external device may be supported in at least one of the application 134, the application programming interface 133, the middleware 132, the kernel 131, or the communication interface 160.

Figure 2:
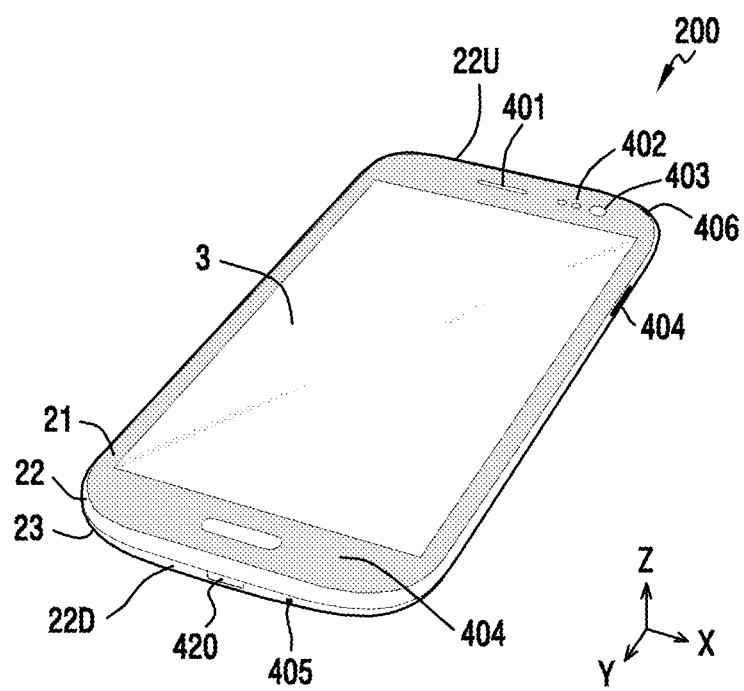
FIG. 2 illustrates an electronic device according to one exemplary embodiment of the present disclosure.

FIG. 2 illustrates an electronic device according to one exemplary embodiment of the present disclosure. The electronic device 200 may include the electronic device 101 illustrated in FIG. 1.

Referring to FIG. 2, the electronic device 200 may include an upper surface 21, a side surface and a lower surface 23. The upper surface 21 and the lower surface 23 face each other, and the side surface 22 (or edge) may be a portion connecting between the upper surface 21 and the lower surface 23. The upper surface 21, the side surface 22 or the lower surface 23 may include a planar surface or a curved surface. For example, the electronic device 200 may include, though not illustrated, an upper surface 21 or lower surface 23 of a form of a concave or convex curved surface. Or, the electronic device 200 may be also flexible or wearable and o have a deformable upper surface 21, side surface 22 or lower surface 23.

The electronic device 200 may include a display set 3, a speaker 401, a sensor 402, a camera 403, a button 404, a microphone 405, an antenna 406, or a socket 420.

The display set 3 may be arranged in the upper surface 21 of the electronic device 200. The display set 3 may include a Liquid Crystal Display (LCD), an Active-Matrix Organic Light Emitting Diode (AMOLED), or the like. Or, the display set 3 may also include a touch sensing device (e.g., a touch panel or digitizer panel) capable of recognizing a touch input.

The speaker 401 may be arranged in the upper surface 21 of the electronic device 200. Or, though not illustrated, the speaker 401 may be arranged in the side surface 22 or lower surface 23 of the electronic device 200.

The sensor 402 may be arranged in the upper surface 21 of the electronic device 200, but is not limited to this. The sensor 402 may measure a physical amount or sense an activation state of the electronic device 200, and convert the measured or sensed information into an electrical signal. This sensor 402 may include a gesture sensor, a proximity sensor, a grip sensor, a gyro sensor, an acceleration sensor, a geomagnetic sensor, an air pressure sensor, a temperature/humidity sensor, a hall sensor, a Red, Green, Blue (RGB) sensor, an illumination sensor, a bio-physical sensor (e.g., a heart rate sensor), or an Ultra Violet (UV) sensor.

The camera 403 may be, as illustrated, arranged in the upper surface 21 of the electronic device 200, but is not limited to this.

The button 404 may be, as illustrated, arranged in the upper surface 21 or side surface 22 of the electronic device 200, but is not limited to this. The button 404 may apply a press method or touch method.

The microphone 405 may be arranged in the side surface 22 of the electronic device 200. Or, the microphone 207 may be also, though not illustrated, arranged in the upper surface 21 or lower surface 23 of the electronic device 200.

The antenna 406 (e.g., a Digital Multimedia Broadcasting (DMB) antenna, a cellular antenna and the like) may be extracted out and extended through a through-hole (not shown) arranged in the side surface 22 of the electronic device 200. Or, the antenna 406 may be, though not illustrated, a built-in antenna mounted in a housing of the electronic device 200 or a case frame thereof or a circuit board (e.g., a main board) thereof.

The socket 420 may be, as illustrated, arranged in the side surface 22 of the electronic device 200, but is not limited to this. The socket 420 (e.g., a Universal Serial Bus (USB) socket, a charging jack, a communication jack or the like) may be arranged in a lower section 22D of the side surface 22. Or, a non-illustrated socket (e.g., ear jack) may be arranged in an upper section 22U of the side surface 22. This socket 420 is an interface device capable of accessing a plug of an external device (e.g., an ear set, a charging device or the like), and may apply a communication method such as a High-Definition Multimedia Interface (HDMI), a USB, a projector, a D-subminiature (D-sub), or the like.

Also, though not illustrated, the electronic device 200 may further include a stylus. The stylus may be separated outside through a through-hole (not shown) arranged in the side surface 22 of the electronic device 200.

Figure 3:
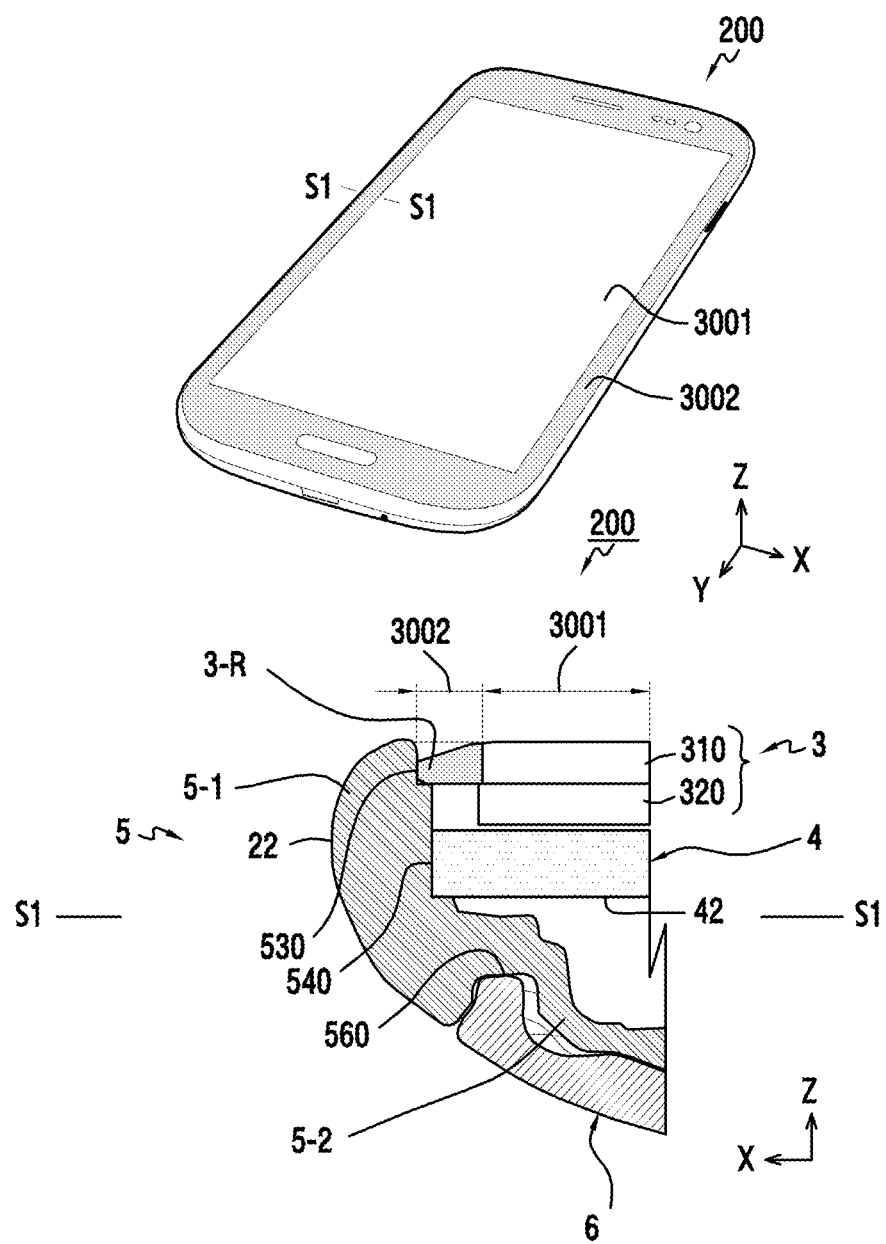
FIG. 3 illustrates a cross section of an electronic device according to one exemplary embodiment of the present disclosure.

FIG. 3 illustrates a cross section of an electronic device according to one exemplary embodiment of the present disclosure.

Referring to FIG. 3, the electronic device 200 may include the display set 3, a Printed Board Assembly (PBA) 4, a device case 5, or a cover 6.

The display set 3 may include a window 310 and a display panel 320. The display set 3 may not include a mounting plate (e.g., a nonmetallic or metallic bracket) arranged under the display panel 320. According to one exemplary embodiment, the window 310 and/or the display panel 320 may provide a desired rigidity of the display set 3.

The window 310 may include a transparent plate, an adhesive layer, a plastic film, a pattern layer, a metal layer, or a light shielding layer.

The transparent plate may be arranged at an upper side of the display panel 320, and protect the display panel 320. The transparent plate may be formed of plastic material such as acrylic and the like having impact resistance, or glass material (e.g., tempered glass).

The adhesive layer may be arranged between the transparent plate and the plastic film, and attach the plastic film to the transparent plate. The adhesive layer may be arranged in an edge area 3002 (e.g., a four-cornered ring area) of the window 310. The adhesive layer may not be overlapped with a view area 3001. Here, the view area 3001 indicates an area displaying an image of the display panel 320, and may be called a 'display area'. The adhesive layer may be transparent. Or, the adhesive layer may be also dyed with a dye, a pigment, a coloring matter, a fluorescent material, a phosphorous material or the like. The adhesive layer may include a Pressure Sensitive Adhesive (PSA).

The plastic film may be attached to the edge area 3002 of the window 310 through the medium of the adhesive layer. The plastic film may be of a belt shape corresponding to the edge area 3002 of the window 310. The plastic film may not be overlapped with the view area 3001. The plastic film may be transparent. The plastic film may be formed of materials of high heat stability and high mechanical strength. The plastic film may be a polyethyleneterephthalate (PET) film, a polycarbonate (PC) film, a polyethylene (PE) film, a polypropylene (PP) film or the like.

The pattern layer may include various patterns (e.g., a plane pattern or a three-dimensional pattern) attached to or printed on a lower surface of the plastic film. The pattern layer may not be overlapped with the view area 3001. The pattern layer may be formed through UV molding. The pattern layer formed by the UV molding may have a pattern corresponding to a pattern formed in a mold. The pattern of the mold may be formed through mechanical processing, laser processing, photolithography or the like. The pattern layer may be lighted by external light and express a metal texture. The pattern of the pattern layer may be a hairline. Because the pattern layer is arranged under the transparent plate having a predetermined thickness, the pattern of the pattern layer may look three dimensional through the transparent plate.

The metal layer may be attached to a lower surface of the pattern layer. The metal layer may not be overlapped with the view area 3001. The metal layer may be formed in a method of depositing (e.g., Physical Vapor Deposition (PVD) or Chemical Vapor Deposition (CVD)) or coating a metal (e.g., stannum (Sn), aluminum (Al), silicon (Si), Titanium (Ti), Titanium Carbide (TiC), Titanium nitride (TiN), TiO 2-impregnated chitosan beads (TiCB), aluminum oxide ($Al_2O_3$) or the like) to the lower surface of the pattern layer. The metal layer may be lighted by external light and express a metal texture. Because the metal layer is arranged under the transparent plate having a predetermined thickness, the pattern of the metal layer may look three dimensional through the transparent plate.

Due to the pattern layer and the metal layer, an area of the transparent plate not corresponding to the view area 3001 may be expressed with metal materials.

The light shielding layer may be formed at a lower surface of the metal layer. The light shielding layer may not be overlapped with the view area 3001. The light shielding layer may shield external light lighted to the edge area 3002 of the transparent plate. The light shielding layer may shield light lighted from the display panel 320 to the edge area 3002 of the transparent plate. The light shielding layer may include a black component absorbing light without reflecting light. The light shielding layer may be a layer printed in black. The light shielding layer may be an adhesive including the black component. The light shielding layer may include a black film and materials of an adhesive component.

The display panel 320 may be arranged under the window 310. For example, the display panel 320 may be attached to a transparent adhesive layer, and arranged under the light shielding layer of the window 310. The display panel 320 may be an LCD, an AMOLED or the like. The display panel 320 may be also implemented flexible, transparent, or wearable. Also, the window 310 may be implemented flexible or wearable.

The display set 3 may further include a touch sensing device (not shown). For example, the touch panel (e.g., a capacitive overlay touch panel, a resistance overlay touch panel or the like) may be arranged between the window 310 and the display panel 320. Or, the digitizer panel may be arranged under the display panel 320. The touch sensing device may sense a touch input within the view area 3001. Here, the view area 3001 may be called a 'touch recognition area'.

The PBA 4 may be arranged under the display set 3. At least a portion of the PBA 4 may come in contact with the display set 3. Or, at least the portion of the PBA 4 is separated a distance from or is away from the display set 3. Or, the PBA 4 and the display set 3 may be arranged in parallel. The PBA 4 may include a substrate on which a basic circuit and a plurality of electronic components are mounted. The PBA 4 may include, for example, a circuit board, a main board or a motherboard. The PBA 4 may set up an execution environment of the electronic device 200, and maintain information thereof, and stably drive the electronic device 200. Also, the PBA 4 may make smooth data input/output exchange among the components of the electronic device 200.

The device case 5 may include a first case body 5-1 and a second case body 5-2. The first case body 5-1 may include the side surface 22 of the electronic device 200. The second case body 5-2 may be extended from the first case body 5-1, and be arranged between the PBA 4 and the cover 6.

Or, the device case 5 may include a first installation part 530, a second installation part 540, or a third installation part 560.

The first installation part 530 may be a part in which the display set 3 is installed. For example, the first installation part 530 may include a ring-shape edge formed at an upper section of the first case body 5-1. An edge 3-R (e.g., an edge of the window 310) of the display set 3 may be attached to the first installation part 530. The display set 3 may be attached to the first installation part 530. A space may be prepared between the display set 3 and the device case 5 and arrange electronic components (e.g., the PBA 4).

The second installation part 540 may be a part in which the PBA 4 is installed. The second installation part 540 may be arranged under the first installation part 530. The second installation part 540 may include various shapes (e.g., a recess) including a planar surface and/or curved surface on which the PBA 4 may be mounted. For example, the second installation part 540 may include a support shape supporting a lower surface 42 of the PBA 4. Or, the second installation part 540 may include a recess (not shown) capable of housing an electronic component (e.g., the socket 420 of FIG. 2) mounted on the lower surface 42 of the PBA 4. Or, the second installation part 540 may include a boss capable of bolt-engaging an electronic component (e.g., the PBA 4). The second installation part 540 may be arranged in at least one of the first case body 5-1 and the second case body 5-2.

The third installation part 560 is a part in which the cover 6 is installed, and may be formed in the second case body 5-2. The third installation part 560 may include a shape capable of making it easy to attach and detach the cover 6. For example, the cover 6 may include a plurality of hooks (not shown) arrayed in an edge thereof, and the third installation part 560 may include a plurality of hook engagement recesses capable of engaging the plurality of hooks of the cover 6. Here, a method of engaging the plurality of hooks of the cover 6 and the plurality of hook engagement recesses of the third installation part 560 may be called a snap-fit engagement method.

The cover 6 may include the lower surface (23 of FIG. 2) of the electronic device 200. When a user exchanges a detachable electronic component (e.g., a memory card, a battery pack or the like) (not shown), the cover 6 is separable from the device case 5. This cover 6 may be called a battery cover. An exposed surface of the cover 6 (i.e., the lower surface 23 of the electronic device 200) may include a curved surface. The exposed surface of the cover 6 may be smoothly connected to an exposed surface of the device case 5 (i.e., the side surface 22 of the electronic device 200), and make beautiful an appearance of the electronic device 200.

The device case 5 and cover 6 may be called a housing altogether. The housing may indicate a box-shape portion surrounding the electronic device 200.

Figure 4:
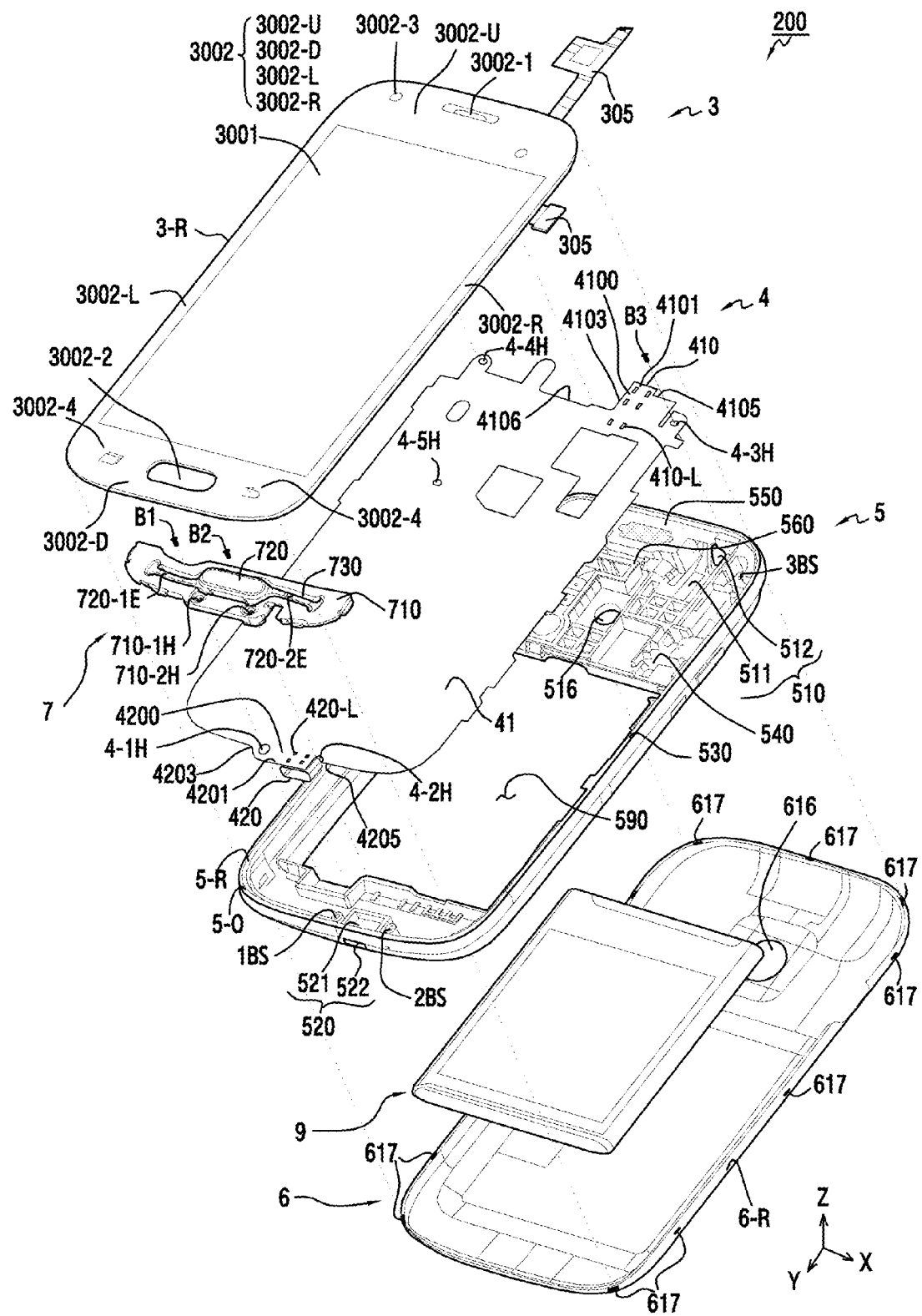
FIG. 4 illustrates separation of an electronic device according to one exemplary embodiment of the present disclosure.

FIG. 4 illustrates separation of an electronic device according to one exemplary embodiment of the present disclosure.

Referring to FIG. 4, the electronic device 200 may include the display set 3, the button body 7, the PBA 4, the device case 5, the battery pack 9, or the cover 6.

The display set 3 may be generally of a four-cornered (e.g., rectangular) flat panel shape. The display set 3 may include the display area 3001 and the non-display area 3002. The display area 3001 may correspond to an image displayable area of the display panel (320 of FIG. 3), and correspond to a screen. The display area 3001 may be of a four-cornered shape being long in Y-axis orientation. The non-display area 3002 (e.g., the edge area 3002 of FIG. 3) is an area surrounding the display area 3001 and may be of a ring shape. For example, the non-display area 3002 may include an upper edge area 3002-U, a lower edge area 3002-D, a left edge area 3002-L, and a right edge area 3002-R. The upper edge area 3002-U and the lower edge area 3002-D may be arranged to face each other. Also, the left edge area 3002-L and the right edge area 3002-R may be arranged to face each other. The upper edge area 3002-U or the lower edge area 3002-D may have a relatively larger width compared to the left edge area 3002-L or the right edge area 3002-R. The non-display area 3002 may be expressed in black. Or, the non-display area 3002 may also express a metal texture.

The display set 3 may include a receiver hole 3002-1 arranged in the non-display area 3002 (e.g., the upper edge area 3002-U). The receiver hole 3002-1 may be located correspondingly to a receiver 550 mounted on the device case 5, and a sound outputted from the receiver 550 may be discharged out through the receiver hole 3002-1.

Or, the display set 3 may include a button hole 3002-2 arranged in the non-display area 3002 (e.g., the lower edge area 3002-D). A button 720 of the button body 7 may be arranged in the upper surface (element 21 of FIG. 2) of the electronic device 200 through the button hole 3002-2.

The display set 3 may further include a transparent area 3002-3 arranged in the non-display area 3002. The transparent area 3002-3 may be arranged correspondingly to a sensor (e.g., an illumination sensor, an image sensor or the like) mounted in the PBA 4.

The display set 3 may further include touch key markers 3002-4 arranged in the non-display area 3002. For example, the touch key markers 3002-4 may be arranged at both sides of the button hole 3002-2. The touch key markers 3002-4 may be arranged correspondingly to a touch key input device (or module) (not shown) arranged under the display set 3.

The display set 3 may include an electrical connection means 305. The electrical connection means 305 may be used to electrically connect between the display panel (element 320 of FIG. 3) mounted on the display set 3 or the touch key device (e.g., the touch panel or digitizer panel) (not shown) and the PBA 4. One end (not shown) of the electrical connection means 305 may include a connector (e.g., a male connector or a female connector) connectable to a connector of the PBA 4. The electrical connection means 305 may be implemented to be bent and may be connected to a connector mounted on the lower surface (element 42 of FIG. 3) of the PBA 4. For example, the electrical connection means 305 may include a Flexible Printed Circuit Board (FPCB) or a cable.

The button body 7 may be arranged between the display set 3 and the PBA 4. The button body 7 may be arranged correspondingly to the lower edge area 3002-D of the display set 3. The button body 7 may be arranged correspondingly to the button hole 3002-2 of the display set 3. Also, the button body 7 may be arranged correspondingly to the socket 420 (e.g., the USB socket) of the PBA 4. The button body 7 may be of a shape being long in X-axis orientation on the whole.

The button body 7 may include a support part 710, a button (or a press button) 720, and a pair of connection parts 720-1E and 720-2E.

The support part 710 may include a pair of bolt holes 710-1H and 710-2H, and a hollow part 730. The pair of bolt holes 710-1H and 710-2H may be arranged correspondingly to a pair of bolt holes 4-1H and 4-2H of the PBA 4. The support part 710 may be fixed to the PBA 4 with a pair of bolts B1 and B2 passing through the pair of bolt holes 710-1H and 710-2H. The hollow part 730 may be a part that is between an upper part of the support part 710 and a lower part thereof. The hollow part 730 may provide a space making it possible to move the button 720 in perpendicular orientation (e.g., Z-axis orientation) on the support part 710.

The button 720 may be moved perpendicularly on the hollow part 730 formed in the support part 710.

The pair of connection parts 720-1E and 720-2E may be extended from both sides of the button 720 and be connected to an inner side of the hollow part 730. The button 720 may be exposed to the upper surface 21 of the electronic device 200 through the button hole 3002-2 of the display set 3, and may be moved downward while being elastically supported by the pair of connection parts 720-1E and 720-2E corresponding to user's pressing.

The button body 7 may be integrally formed using a predetermined shaping method (e.g., injection molding).

The PBA 4 may be arranged between the button body 7 and the device case 5. The PBA 4 may include an upper surface 41 and a lower surface (element 42 of FIG. 3). The upper surface 41 or the lower surface (element 42 of FIG. 3) may mount a plurality of electronic components. A part of the upper surface 41 may come in contact with the button body 7. Also, the part of the upper surface 41 may face a lower surface (not shown) of the display set 3, and may come in contact with the lower surface of the display set 3 or not so. The lower surface (element 42 of FIG. 3) may come in contact with the device case 5.

The PBA 4 may include a plurality of sockets 410 and 420.

One socket 410 (e.g., ear jack) may be arranged in an upper end of the lower surface (element 42 of FIG. 3), and may be called an upper end socket. Also, the other socket 420 (e.g., USB socket) may be arranged in a lower end of the lower surface 42 of FIG. 3), and may be called a lower end socket. A plurality of the sockets 410 and 420 may be of a Dual Inline Package (DIP) type. For example, a plurality of leads (not shown) of the plurality of sockets 410 and 420 may be inserted into a plurality of component holes (not shown) of the PBA 4 and may be fixed to a plurality of lands 410-L and 420-L prepared at the upper surface 41 using soldering. Or, the plurality of sockets 410 and 420 may be also of a Surface Mount Device (SMU) type.

The PBA 4 may include a first substrate area 4100 and a second substrate area 4200.

The first substrate area 4100 may include a substrate area mounting the upper end socket 410. The first substrate area 4100 may include an extension part 4101. The extension part 4101 may have a predetermined width, and include a shape relatively protruded in Y-axis orientation with respect to the peripheral substrate area. For example, the PBA 4 may include a shape part 4103 omitting a substrate area of a predetermined width arranged at the left side of the first substrate area 4100. Or, the PBA 4 may include a shape part 4105 omitting a substrate area of a predetermined width arranged at the right side of the first substrate area 4100.

The second substrate area 4200 may include a substrate area mounting the lower end socket 420. The second substrate area 4200 may include an extension part 4201. The extension part 4201 may have a predetermined width, and include a shape relatively protruded in Y-axis orientation with respect to the peripheral substrate area. For example, the PBA 4 may include a shape part 4203 omitting a substrate area of a predetermined width arranged at the left side of the second substrate area 4200. Or, the PBA 4 may include a shape part 4205 omitting a substrate area of a predetermined width arranged at the right side of the second substrate area 4200.

The PBA 4 may include a plurality of bolt holes 4-1H, 4-2H, 4-3H, 4-4H, and 4-5H. The plurality of bolt holes 4-1H, 4-2H, 4-3H, 4-4H, and 4-5H may be arranged around an edge of the PBA 4. Or, the plurality of bolt holes 4-1H, 4-2H, and 4-3H may be arranged around the socket (e.g., the upper end socket 410 or the lower end socket 420). The plurality of bolt holes 4-1H, 4-2H and 4-3H may be arranged correspondingly to a plurality of bosses 1BS, 2BS, and 3BS of the device case 5.

The PBA 4 may be fixed to the device case 5 with the plurality of bolts B1, B2, and B3 which pass through the plurality of bolt holes 4-1H, 4-2H and 4-3H and are engaged to the plurality of bosses 1BS, 2BS, and 3BS of the device case 5. Here, the pair of bolts B1 and B2 may pass through the pair of bolt holes 710-1H and 710-2H of the button body 7 and the pair of bolt holes 4-1H and 4-2H of the PBA 4 and be engaged to the pair of bosses 1BS and 2BS of the device case 5. The button body 7, the PBA 4, and the device case 5 may be connected together.

The device case 5 may be arranged under the PBA 4. The device case 5 may include the first installation part 530, the second installation part 540, or a battery pack installation part 590.

The first installation part 530 is a part to which the display set 3 is attached, and may include an upper opening part 5-0 of the device case 5. For example, the first installation part 530 may include a ring-shape edge 5-R of the upper opening part 5-0. An edge 3-R (e.g., a ring-shape edge) of the display set 3 may be attached to the edge 5-R (e.g., the ring-shape edge) of the upper opening part 5-0 of the device case 5 with an attachment means (e.g., an adhesive resin and the like).

The second installation part 540 may include an upper end socket installation part 510 and a lower end socket installation part 520.

The upper end socket installation part 510 may include a shape capable of arranging the upper end socket 410 (e.g., the ear jack). For example, the upper end socket installation part 510 may include a fitting space 511 and a through-hole 512. The fitting space 511 may provide a space capable of fitting the upper end socket 410. The through-hole 512 may open the fitting space 511 to the external. A plug of an external device may be coupled to the upper end socket 410 by passing through the through-hole 512.

The lower end socket installation part 520 may include a shape capable of arranging the lower end socket 420 (e.g., USB socket). For example, the lower end socket installation part 520 may include the fitting space 521 and the through-hole 522. The fitting space 521 may provide a space capable of fitting the lower end socket 420. The fitting space 521 may include a space surrounded by side walls. The through-hole 522 may open the fitting space 521 to the exterior.

The second installation part 540 may include the plurality of bosses 1BS, 2BS, and 3BS. The plurality of bosses 1BS, 2BS, and 3BS may be arranged correspondingly to the plurality of bolt holes 4-1H, 4-2H and 4-3H of the PBA 4. The plurality of bosses 1BS, 2BS, and 3BS may be screw-mountain engaged with the bolts B1, B2 and B3, and be also prepared as separate metal members.

The battery pack installation part (i.e., lower opening part) 590 may be a part passing through between an upper part of the device case 5 and a lower part thereof. The PBA 4 may be coupled to the device case 5, and a battery pack related electronic component arranged in the lower surface 42 of the PBA 4 may be exposed through the battery pack installation part 590. For example, the battery pack related electronic component may include terminals (e.g., elastic terminals) capable of coming in electrical contact with a plurality of terminals (not shown) of the battery pack 9.

The device case 5 may include the receiver 550. The receiver 550 may be arranged in an upper section of the device case 5. Or, the receiver 550 may be arranged beside the upper end socket installation part 510. The receiver 550 may be arranged correspondingly to the receiver hole 3002-1 of the display set 3. The PBA 4 may include a shape 4106 not stopping a sound passage between the receiver 550 of the device case 5 and the receiver hole 3002-1 of the display set 3. The PBA 4 may be coupled to the device case 5, and a plurality of terminals (not shown) of the receiver 550 of the device case 5 may be electrically connected to a plurality of terminals (not shown) prepared at the lower surface (element 42 of FIG. 3) of the PBA 4.

The device case 5 may include a conductive shielding component 560. The conductive shielding component 560 may be arranged in the second installation part 540. For example, the conductive shielding member 560 may include a conductive rubber gasket, and the conductive rubber gasket may come in electrical contact with a ground pad (not shown) prepared at the lower surface (element 42 of FIG. 3) of the PBA 4. The conductive shielding component 560 may reduce an electrical noise generated in the electronic device 200.

The device case 5 may include a transparent window 516. For example, the transparent window 526 may be arranged correspondingly to an optical electronic component (e.g., a camera module) arranged in the lower surface (element 42 of FIG. 3) of the PBA 4.

The battery pack 9 may be arranged in the battery pack installation part 590, and may be electrically connected to the battery pack related electronic component of the PBA 4.

The cover 6 may be arranged under the device case 5. The cover 6 may include a through-hole 616 and a plurality of hooks 617. The through-hole 616 may be arranged correspondingly to the transparent window 516 of the device case 5. The plurality of hooks 617 may be arranged in an edge 6-R. The plurality of hooks 617 may be engaged to a plurality of hook engagement recesses (not shown) of the device case 5, and the cover 6 may be coupled to the device case 5.

Alternatively or in addition, the electronic device 200 may include a touch key module (not shown).

The touch key module may be arranged correspondingly to the touch key marker 3002-4 of the display set 3. For example, the touch key module may be arranged between the PBA 4 and the button body 7. Or, the touch key module may be also arranged between the display set 3 and the button body 7. Or, the touch key module may be installed in the PBA 4, or be electrically connected to the PBA 4 through the medium of an electrical connection means (e.g., FPCB).

Or, the PBA 4 may include a switch module (not shown).

The switch module (e.g., press switch) of the PBA 4 may be arranged correspondingly to the button 720 of the button body 7. For example, the switch module may be mounted on the PBA 4, or be electrically connected to the PBA 4 through the medium of an electrical connection means (e.g., FPCB).

Figure 5:
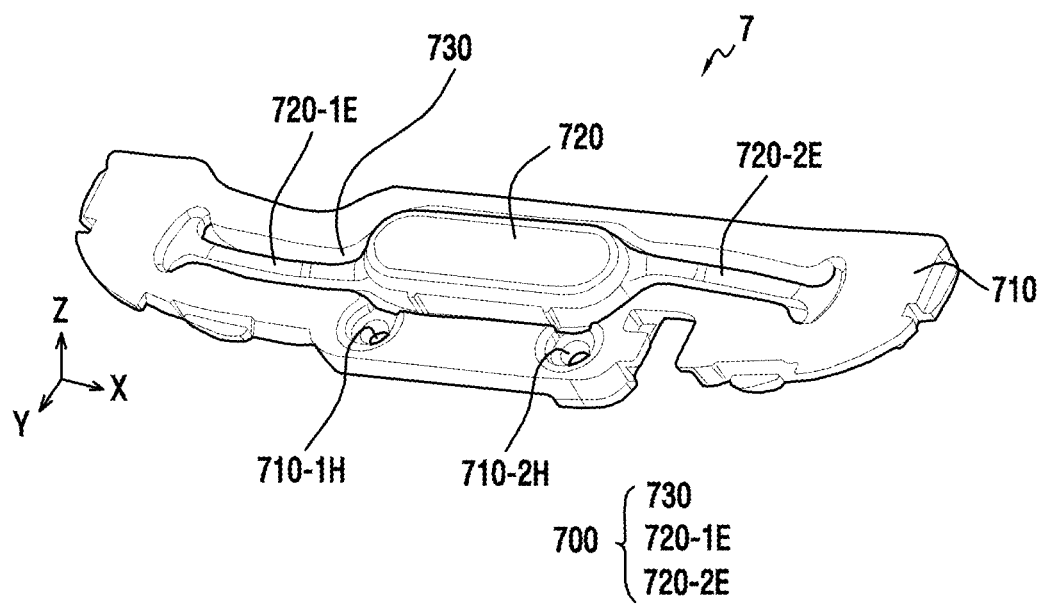
FIG. 5 illustrates a button body according to one exemplary embodiment of the present disclosure.

FIG. 5 illustrates a button body according to one exemplary embodiment of the present disclosure.

Referring to FIG. 5, the button body 7 may include an elasticity providing shape part 700. A button 720 of the button body 7 may be elastically supported by the elasticity providing shape part 700 while being moved in Z-axis orientation. The elasticity providing shape part 700 may include a hollow part 730 and a pair of connection parts 720-1E and 720-2E.

The hollow part 730 may be generally of a shape conforming to an external shape of the button 720 and the pair of connection parts 720-1E and 720-2E.

The pair of connection parts 720-1E and 720-2E may connect between the button 720 and the support part 710. The pair of connection parts 720-1E and 720-2E may be of a curved line form. Or, the pair of connection parts 720-1E and 720-2E may be also of a shape rising toward the button 720. The pair of connection parts 720-1E and 720-2E may be of a beam form having an end that is fixed to the support part 710, and may be elastically deformed (e.g., elastic deformation). The button 720 connected to the other sides of the pair of connection parts 720-1E and 720-2E may be moved in key press orientation (e.g., Z-axis orientation).

The present disclosure is not limited to the button body 7 illustrated in FIG. 5, and would be integrally formed in various shapes and elastically support the movement of the button 720.

Figure 6:
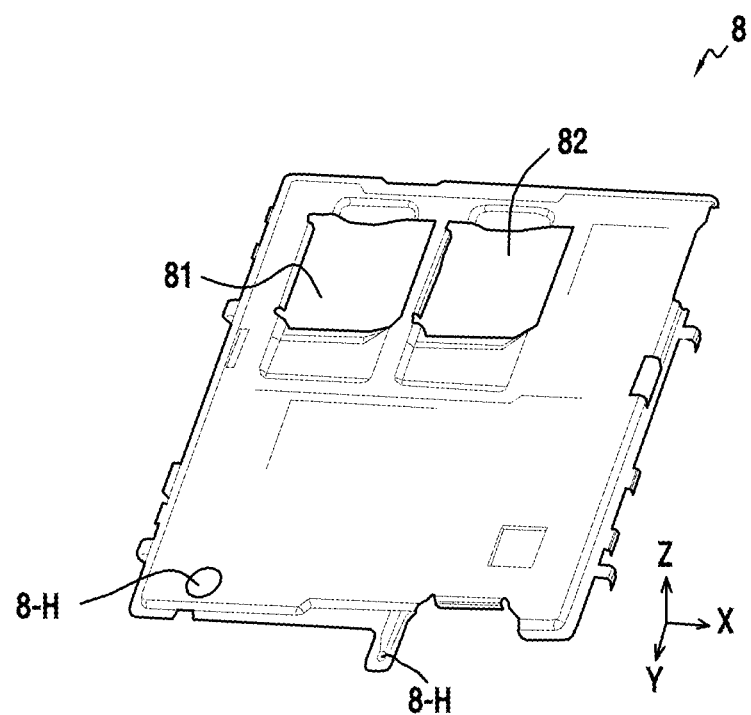
FIG. 6 illustrates a shield can according to one exemplary embodiment of the present disclosure.

FIG. 6 illustrates a shield can according to an embodiment of the present disclosure.

Referring to FIG. 6, a shield can 8 may be generally of a flat panel shape. The shield can 8 may be arranged in the lower surface (element 42 of FIG. 3) of the PBA 4. Or, at least a part of the shield can 8 may be arranged between the PBA 4 and the device case 5. Or, at least the part of the shield can 8 may be also exposed through the battery pack installation part 590 of the device case 5. This shield can 8 may reduce an electrical noise generated in the electronic device 200.

The shield can 8 may include a plurality of through-holes 81 and 82 passing through between an upper part thereof and a lower part thereof or a plurality of bolt holes 8-H. The plurality of through-holes 81 and 82 may expose electronic components (e.g., a memory card socket, a Subscriber Identification Module (SIM) card socket and the like) (not shown) installed in the lower surface (element 42 of FIG. 3) of the PBA 4. The plurality of bolt holes 8-H may also be used for bolt engagement with the PBA 4. Or, the plurality of bolt holes 8-H may also be used for bolt engagement with the device case 5.

Figure 7:
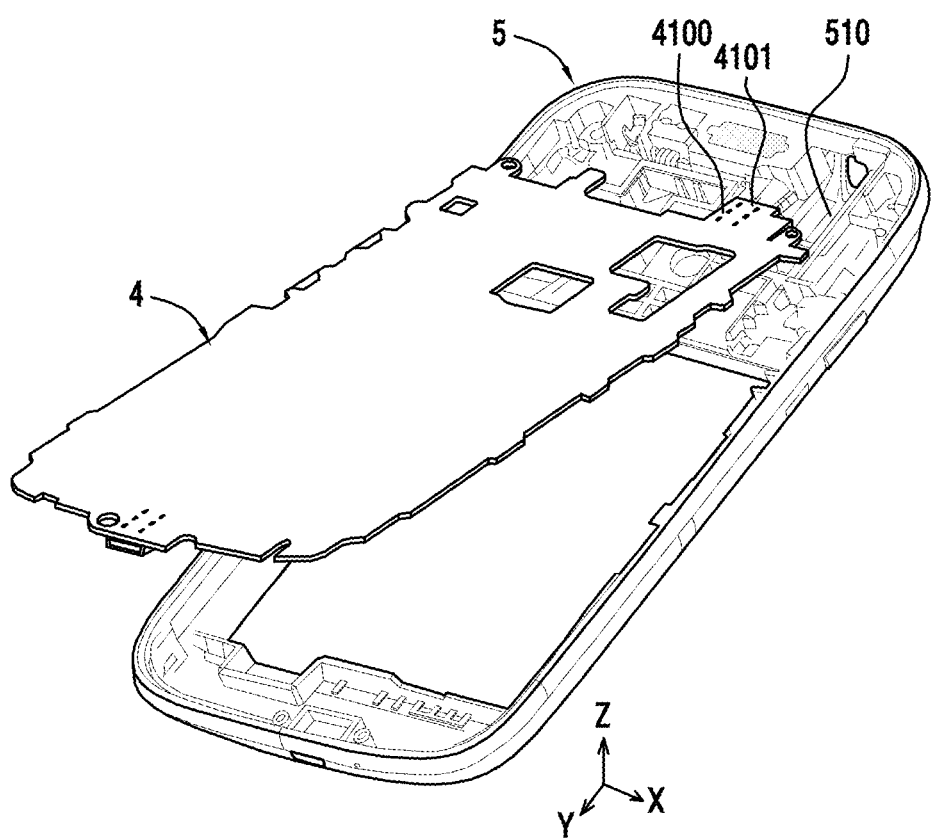
FIG. 7 illustrates a Printed Board Assembly (PBA) and a device case according to one exemplary embodiment of the present disclosure.

FIG. 7 illustrates a PBA and a device case according to an embodiment of the present disclosure.

Referring to FIG. 7, the PBA 4 may be arranged in the device case 5 in a method of inserting the extension part 4101 of the first substrate area 4100 of the PBA 4 to the upper end socket installation part 510 of the device case 5 and then rotating the PBA 4 with respect to a connection between the extension part 4101 and the upper end socket installation part 510. A catching jaw (element 513 of FIG. 8) of the upper end socket installation part 510 of the device case 5 may stop the extension part 4101 of the PBA 4 from being moved in perpendicular orientation.

Figure 8:
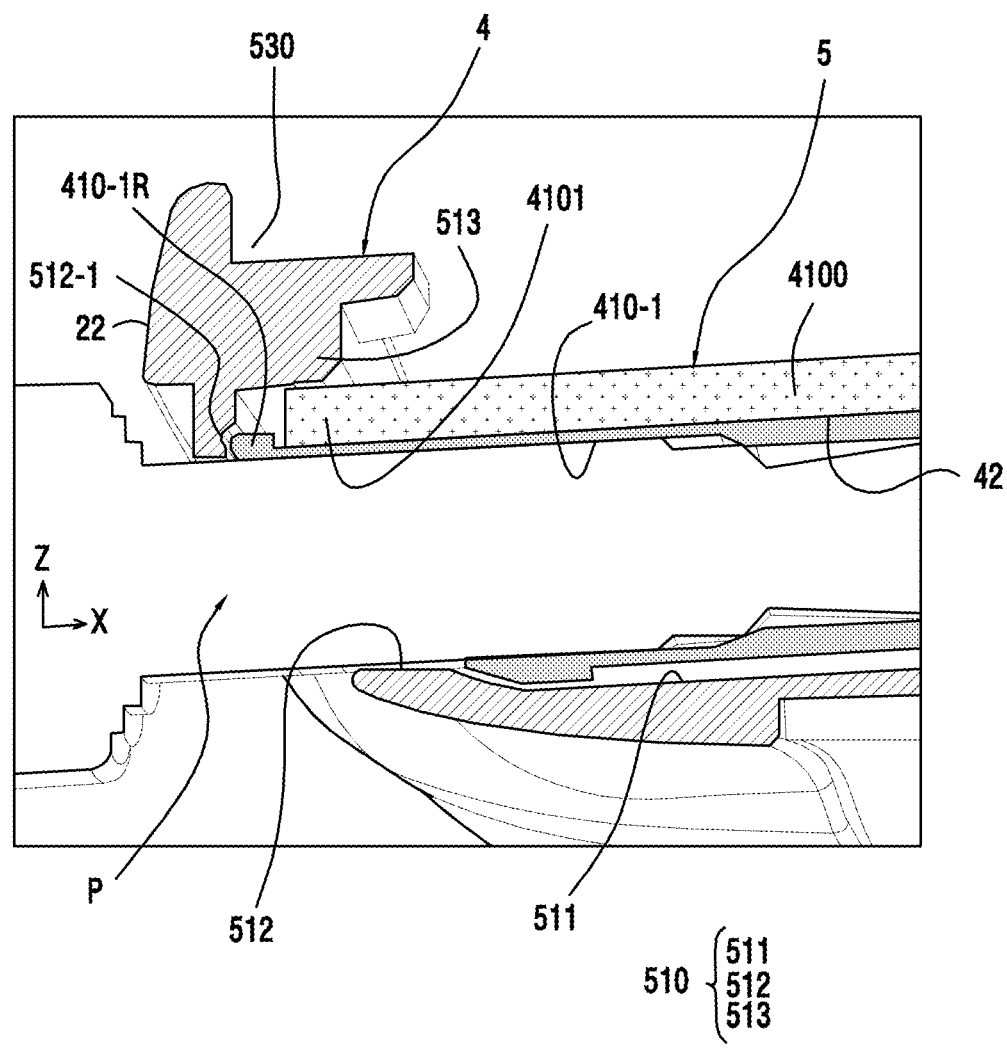
FIG. 8 is a cross section of an electronic device according to one exemplary embodiment of the present disclosure.

FIG. 8 is a cross section of an electronic device according to one exemplary embodiment of the present disclosure.

Referring to FIG. 8, the upper end socket installation part 510 of the device case 5 may include the fitting space 511, the through-hole 512, and the catching jaw 513.

The fitting space 511 may include a shape of a planar surface and/or curved surface capable of supporting the upper end socket 410 mounted on the lower surface 42 of the PBA 4.

The through-hole 512 may be arranged in the side surface 22 of the electronic device 200. The through-hole 512 may include an undercut 512-1 of a recess shape of housing a portion of an entrance edge 410-1R of a plug insertion part 410-1 of the upper end socket 410. A plug (P) of an external device may be accessed to the plug insertion part 410-1 of the upper end socket 410 through the through-hole 512.

The catching jaw 513 may include a shape relatively protruded in X-axis orientation with respect to the surroundings. The catching jaw 513 may be arranged on the through-hole 512. Also, the catching jaw 513 may be arranged under the first installation part 530 (e.g., a portion in which the display set 3 is installed). The extension part 4101 of the first substrate area 4100 may not be moved upward (e.g., in Z-axis orientation) because being interrupted by the catching jaw 513. The PBA 4 may be closely coupled to the device case 5 by the catching jaw 513.

Figure 9:
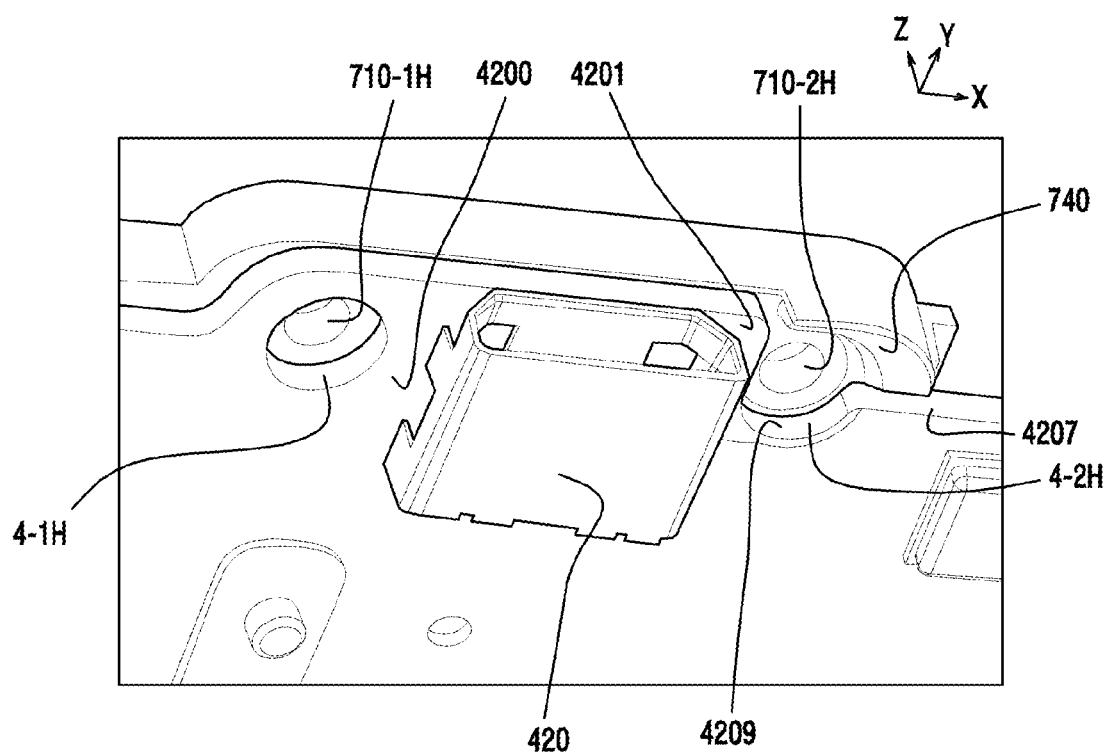
FIG. 9 illustrates a PBA and a button body according to one exemplary embodiment of the present disclosure.

FIG. 9 illustrates a PBA and a button body according to one exemplary embodiment of the present disclosure.

Referring to FIG. 9, the PBA 4 may include the pair of bolt holes 4-1H and 4-2H. The lower end socket 420 may be arranged between the pair of bolt holes 4-1H and 4-2H.

The one bolt hole 4-1H may be arranged in the second substrate area 4200.

Also, the other bolt hole 4-2H may be arranged outside the second substrate area 4200. For example, the other bolt hole 4-2H includes an undercut 4209 including a valley such as a recess in a portion connecting between the extension part 4201 of the second substrate area 4200 and a peripheral area 4207. This undercut 4207 may be the bolt hole 4-2H.

The button body 7 may include an extension part 740. The extension part 740 may be extended perpendicularly (e.g., in Z-axis orientation) from a peripheral area of the bolt hole 710-2H of the button body 7 and be coupled to the shape part (element 4205 of FIG. 4) of the PBA 4. The extension part 740 may facilitate assembly between the button body 7 and the PBA 4.

Figure 10:
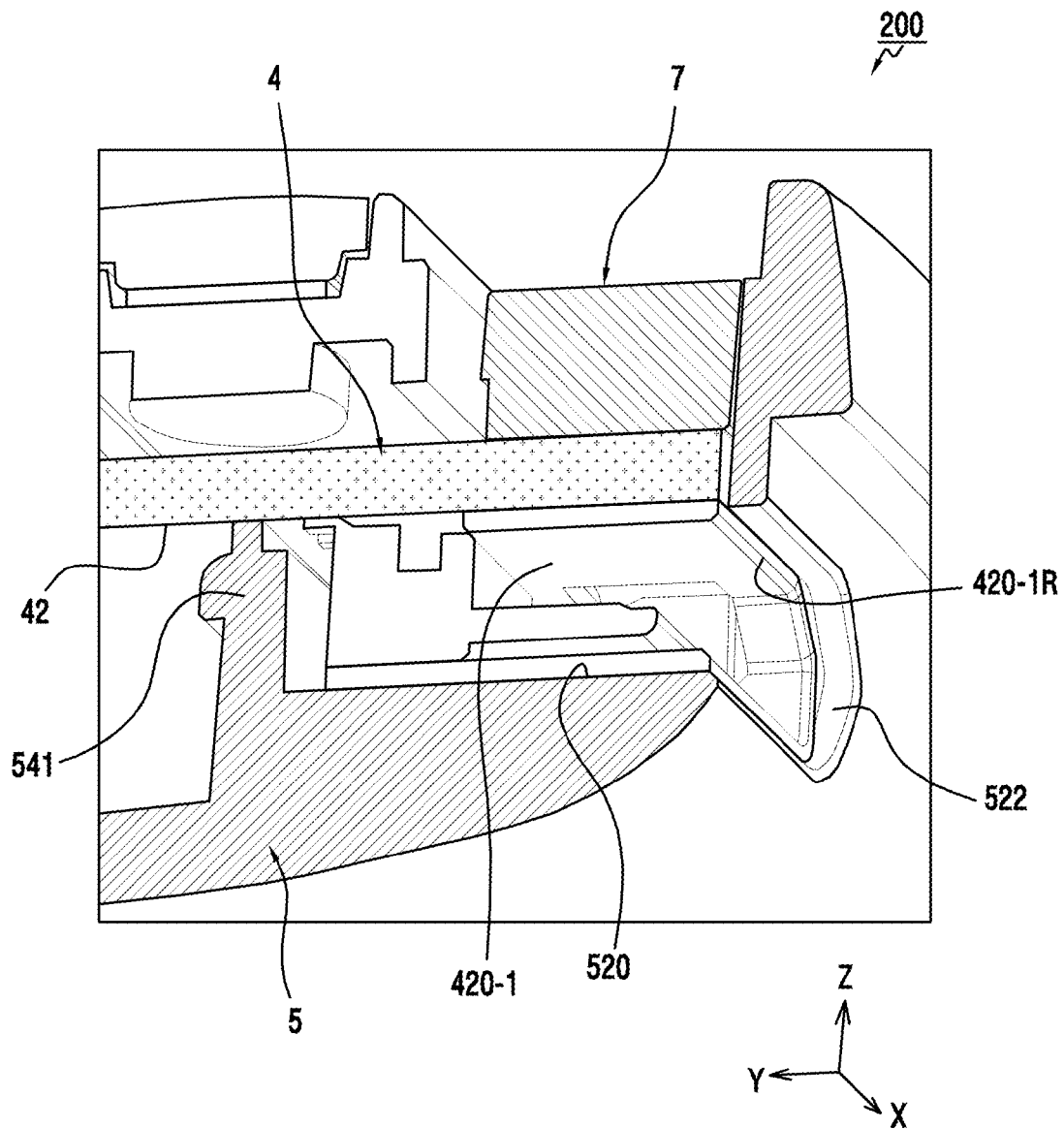
FIG. 10 illustrates a cross section of an electronic device according to one exemplary embodiment of the present disclosure.

FIG. 10 illustrates a cross section of an electronic device according to one exemplary embodiment of the present disclosure.

Referring to FIG. 10, the electronic device 200 may include the PBA 4, the device case 5, and the button body 7.

The device case 5 may include a shape part 541 capable of supporting the lower surface 42 of the PBA 4. Or, the device case 5 may include a shape part (e.g., the lower end socket installation part 520) arranged in the lower surface 42 of the PBA 4. This shape part 520 may support the lower end socket 420. Or, the device case 5 include the through-hole 522, and this through-hole 522 may come in contact with an entrance edge 420-1R of a plug insertion part 420-1 of the lower end socket 420. The through-hole 522 may include elastic materials.

The button body 7, the PBA 4, and the device case 5 may be coupled together. For example, the pair of bolts (B1 and B2 of FIG. 4) may be inserted into the pair of bolt holes (710-1B and 710-2B of FIG. 9) of the button body 7 and the pair of bolt holes (4-1B and 4-2B of FIG. 9) of the PBA 4 and be engaged to the bosses (1BS and 2BS of FIG. 4) of the device case 5.

Referring back to FIG. 4, the electronic device 200 may include a housing (e.g., the device case 5) including an upper opening part 5-0, a flat panel display set 3 arranged in the upper opening part 5-0 and including a screen (e.g., the display area 3001), and a circuit board (e.g., PBA 4) arranged under the flat type display set 3, and coupled to an inner surface of the housing 5.

According to an embodiment of the present disclosure, the circuit board (e.g., the PBA 4) may be away from the plate panel display set 3.

According to an embodiment of the present disclosure, the flat panel display set 3 may further include a non-display area 3002 arranged around the screen (e.g., the display area 3001), and a through-hole (e.g., a receiver hole 3002-1, a button hole 3002-2) arranged in the non-display area 3002.

According to an embodiment of the present disclosure, the circuit board (e.g., the PBA 4) may further include a button body 7 arranged in an upper surface 41 thereof. The button body 7 may include a press button 720. The press button may be arranged in the through-hole (e.g., the button hole 3002-2) of the flat panel display set 3.

According to an embodiment of the present disclosure, the button body 7 may be coupled to the housing 5 together with the circuit board 4.

According to an embodiment of the present disclosure, a bolt (e.g., bolts B-1, 2) may be inserted into a bolt hole (e.g., a pair of button holes 710-1H, 2H) of the button body 7 and a bolt hole (e.g., a pair of button holes 4-1H, 2H) of the circuit board 4 and may be engaged to the housing 5.

According to an embodiment of the present disclosure, the button body 7 may be integrally shaped to include a shape part (e.g., an elasticity provision shape part 700) for elastically supporting the press button 720.

According to an embodiment of the present disclosure, the circuit board 4 may further include a socket (e.g., a lower end socket 420) arranged in a lower surface 42 thereof, and the socket 420 may be arranged down perpendicularly to the button body 7.

According to an embodiment of the present disclosure, the housing 5 may further include a through-hole 522. A plug insertion part 420-1 of the socket 420 may be opened to the external through the through-hole 522.

According to an embodiment of the present disclosure, the housing 5 may further include a receiver 550 arranged down perpendicularly to the through-hole (e.g., the receiver hole 3002-1) of the flat panel display set 3. The circuit board 4 may include a shape 4106 of omitting an area between the through-hole (e.g., the receiver hole 3002-1) of the flat panel display set 3 and the receiver 550.

According to an embodiment of the present disclosure, the housing 5 may further include a space (e.g., a fitting space 511) for fitting a partial edge area (e.g., a first substrate area 4100) of the circuit board 4. Also, the housing 5 may include a catching jaw 513 for stopping the partial edge area 4100 of the circuit board 4 from getting out of the fitting space 511 and moving perpendicularly.

According to an embodiment of the present disclosure, the circuit board 4 may further include a socket (e.g., an upper end socket 410) arranged in a lower surface 42 thereof. The socket 410 may be arranged in the space 511.

According to an embodiment of the present disclosure, the housing 5 may further include a through-hole 512. The plug insertion part 410-1 of the socket (e.g., the upper end socket 410) may be opened to the external through the through-hole 512.

According to an embodiment of the present disclosure, an edge 3-R of the flat panel display set 3 may be attached to an edge 5-R of the upper opening part 5-0 of the housing 5.

According to an embodiment of the present disclosure, the circuit board 4 may further include a flat panel shield can 560 arranged in a lower surface 42 thereof and shielding electronic noises.

According to an embodiment of the present disclosure, the housing 5 may further include a lower opening part (e.g., a battery pack installation part 590) facing the upper opening part 5-0.

According to an embodiment of the present disclosure, a battery pack 9 may be arranged in the lower opening part 590.

According to an embodiment of the present disclosure, a cover 6 may cover the lower opening part 590.

According to an embodiment of the present disclosure, the flat panel display set 3 may further include a touch sensing panel.

According to an embodiment of the present disclosure, an electronic device 200 may include a housing (e.g., a device case 5) including an upper opening part 5-0, a flat panel display set 3 arranged in the upper opening part 5-0 and including a screen (e.g., a display area 3001), a circuit board 4 arranged under the flat type display set 3, and coupled to an inner surface of the housing 5, and a button body 7 arranged between the flat panel display set 3 and the circuit board 4, and coupled to the housing 5 together with the circuit board 4 using a bolt connection method. The flat panel display set 3 may include a non-display area 3002 arranged around the screen 3001, and a through-hole (e.g., a button hole 3002-2) arranged in the non-display area 3002. The button body 7 may include a press button being arranged in the through-hole 3002-2 of the flat panel display set 3, and be integrally shaped to include a shape part (e.g., an elastic provision shape part 700) for elastically supporting the press button 720. The housing 5 may include a space (e.g., a fitting space 511) for fitting a partial edge area (e.g., a first substrate area 4100) of the circuit board 4, and/or a catching jaw 513 for stopping the partial edge area 4100 of the circuit board 4 from getting out of the space 511 and moving perpendicularly.

Figure 11:
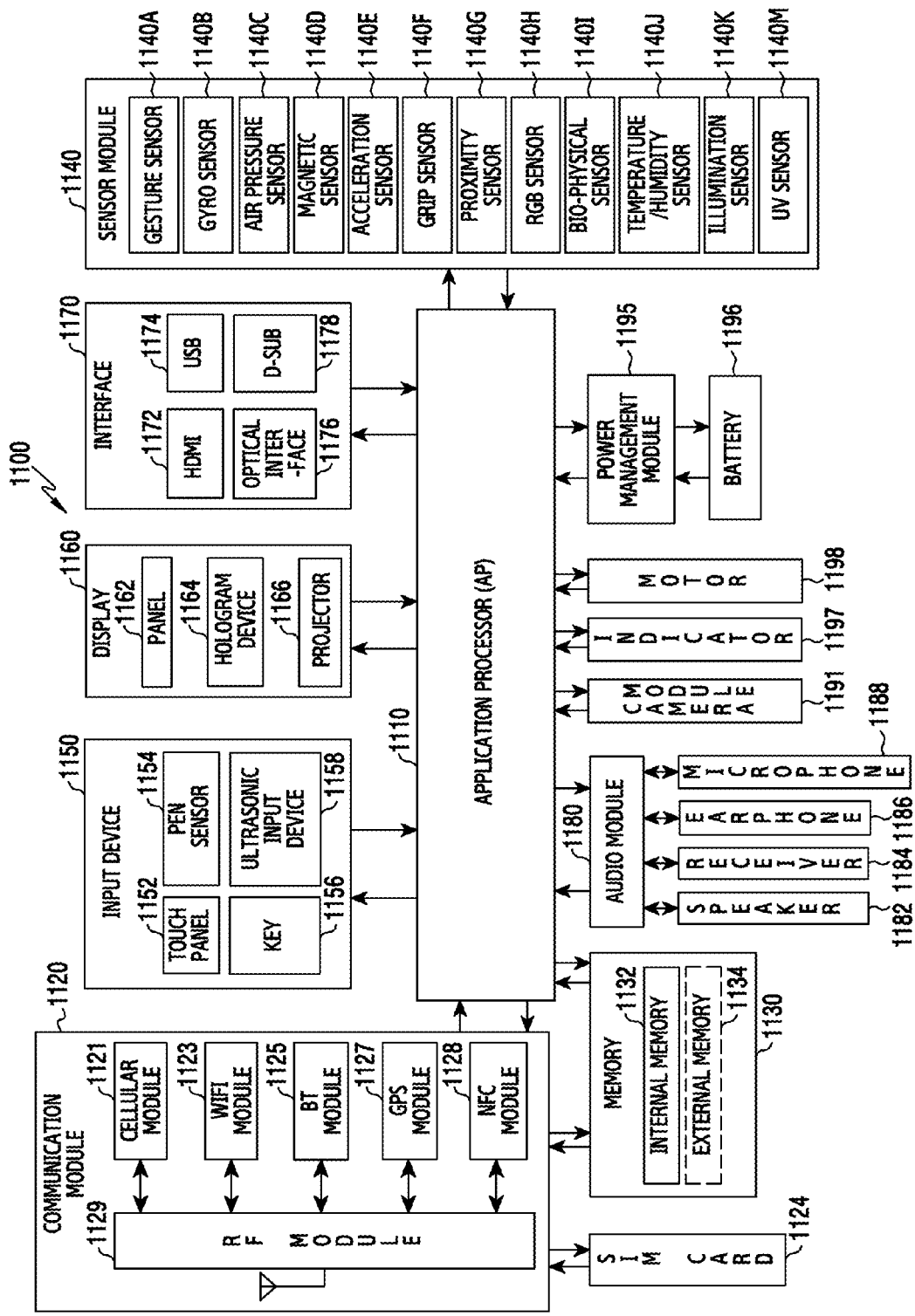
FIG. 11 illustrates a block diagram of an electronic device according to one exemplary embodiment of the present disclosure.

FIG. 11 illustrates a block diagram of an electronic device according to one exemplary embodiment of the present disclosure. The electronic device 1100 may, for example, include the whole or part of the electronic device 101 illustrated in FIG. 1.

Referring to FIG. 11, the electronic device 1100 may include one or more Application Processors (APs) 1110, a communication module 1120, a Subscriber Identification Module (SIM) card 1124, a memory 1130, a sensor module 1140, an input device 1150, a display 1160, an interface 1170, an audio module 1180, a camera module 1191, a power management module 1195, a battery 1196, an indicator 1197, and/or a motor 1199.

The AP 1110 may drive an operating system or an application program and control a plurality of hardware or software constituent elements connected to the AP 1110, and perform processing and operation of various data including multimedia data. The AP 1110 may be, for example, implemented as a System On Chip (SoC). According to one exemplary embodiment, the AP 1110 may further include a Graphic Processing Unit (GPU) (not shown).

The communication module 1120 (e.g., the communication interface 160) may perform data transmission/reception in communication between other electronic devices (e.g., the electronic device 104 or the server 106) that are connected with the electronic device 1100 (e.g., the electronic device 101) through a network. According to an embodiment, the communication module 1120 may include a cellular module 1121, a WiFi module 1123, a BT module 1125, a GPS module 1127, an NFC module 1128, and a Radio Frequency (RF) module 1129.

The cellular module 1121 may provide voice telephony, video telephony, a text service, an internet service or the like through a telecommunication network (e.g., LTE, LTE-A, CDMA, WCDMA, UMTS, WiBro, GSM or the like). Also, the cellular module 1121 may, for example, perform electronic device distinction and authorization within the telecommunication network using a subscriber identification module (e.g., the SIM card 1124). According to one exemplary embodiment, the cellular module 1121 may perform at least some functions among functions that the AP 1110 may provide. For example, the cellular module 1121 may perform at least a part of a multimedia control function.

According to one exemplary embodiment, the cellular module 1121 may include a Communication Processor (CP). Also, the cellular module 1121 may be, for example, implemented as a SoC. In FIG. 11, the constituent elements such as the cellular module 1121 (e.g., the communication processor), the memory 1130, the power management module 1195 or the like are illustrated as constituent elements apart from the AP 1110 but, according to one exemplary embodiment, the AP 1110 may be implemented to include at least some (e.g., the cellular module 1121) of the aforementioned constituent elements.

According to one exemplary embodiment, the AP 1110 or the cellular module 1121 (e.g., the communication processor) may load to a volatile memory an instruction or data received from a non-volatile memory connected to each of the AP 1110 and the cellular module 1121 or at least one of other constituent elements, and process the loaded instruction or data. Also, the AP 1110 or the cellular module 1121 may store in the non-volatile memory data received from at least one of other constituent elements or generated by at least one of the other constituent elements.

The WiFi module 1123, the BT module 1125, the GPS module 1127 or the NFC module 1128 each may, for example, include a processor for processing data transmitted/received through the corresponding module. In FIG. 11, the cellular module 1121, the WiFi module 1123, the BT module 1125, the GPS module 1127 or the NFC module 1128 are illustrated as separate blocks but, according to one exemplary embodiment, at least some (e.g., two or more) of the cellular module 1121, the WiFi module 1123, the BT module 1125, the GPS module 1127 or the NFC module 1128 may be included within one IC or IC package. For example, at least some (e.g., the communication processor corresponding to the cellular module 1121 and/or a WiFi processor corresponding to the WiFi module 1123) of the processors each corresponding to the cellular module 1121, the WiFi module 1123, the BT module 1125, the GPS module 1127 or the NFC module 1128 may be implemented as one SoC.

The RF module 1129 may take charge of transmission/reception of data, for example, transmission/reception of an RF signal. Though not illustrated, the RF module 1129 may, for example, include a transceiver, a Power Amplifier Module (PAM), a frequency filter, a Low Noise Amplifier (LNA) or the like. Also, the RF module 1129 may further include a component for transmitting/receiving an electromagnetic wave on a free space in wireless communication, for example, a conductor, a conductive wire or the like. FIG. 11 illustrates that the cellular module 1121, the WiFi module 1123, the BT module 1125, the GPS module 1127 and the NFC module 1128 share one RF module 1129 with each other but, according to one exemplary embodiment, at least one of the cellular module 1121, the WiFi module 1123, the BT module 1125, the GPS module 1127 or the NFC module 1128 may perform transmission/reception of an RF signal through a separate RF module.

The SIM card 1124 may be a card including a subscriber identification module, and may be inserted into a slot provided in a specific position of the electronic device 1100. The SIM card 1124 may include unique identification information (e.g., an Integrated Circuit Card ID (ICCID)) or subscriber information (e.g., an International Mobile Subscriber Identity (IMSI)).

The memory 1130 (e.g., the memory 130) may include an internal memory 1132 or an external memory 1134. The internal memory 1132 may, for example, include at least one of a volatile memory (for example, a Dynamic Random Access Memory (DRAM), a Static RAM (SRAM), a Synchronous Dynamic RAM (SDRAM) and the like) or a non-volatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory and the like).

According to one exemplary embodiment, the internal memory 1132 may be a Solid State Drive (SSD). The external memory 1134 may further include a flash drive, for example, Compact Flash (CF), Secure Digital (SD), micro-SD, mini-SD, extreme Digital (xD), a memory stick, or the like. The external memory 1134 may be operatively connected with the electronic device 1100 through various interfaces. According to one exemplary embodiment, the electronic device 1100 may further include a storage device (or a storage media) such as a hard drive.

The sensor module 1140 may measure a physical quantity or sense an activation state of the electronic device 1100, and convert measured or sensed information into an electric signal. The sensor module 1140 may, for example, include at least one of a gesture sensor 1140A, a gyro sensor 1140B, an air pressure sensor 1140C, a magnetic sensor 1140D, an acceleration sensor 1140E, a grip sensor 1140F, a proximity sensor 1140G, a color sensor 1140H (e.g., a Red, Green, Blue (RGB) sensor), a bio-physical sensor 1140I, a temperature/humidity sensor 1140J, an illumination sensor 1140K, or a Ultraviolet (UV) sensor 1140L. Additionally or alternatively, the sensor module 1140 may, for example, include an E-nose sensor (not shown), an Electromyography (EMG) sensor (not shown), an Electroencephalogram (EEG) sensor (not shown), an Electrocardiogram (ECG) sensor (not shown), an Infrared (IR) sensor (not shown), an iris sensor (not shown), a fingerprint sensor (not shown) or the like. The sensor module 1140 may further include a control circuit for controlling at least one or more sensors belonging to therein.

The input device 1150 may include a touch panel 1152, a (digital) pen sensor 1154, a key 1156, or an ultrasonic input device 1158. The touch panel 1152 may, for example, recognize a touch input in at least one of a capacitive overlay method, a pressure sensitive method, an infrared beam method, or an acoustic wave method. Also, the touch panel 1152 may also further include a control circuit. In a case of the capacitive overlay method, physical contact or proximity recognition is possible. The touch panel 1152 may also further include a tactile layer. In this case, the touch panel 1152 may provide a tactile response to a user.

The (digital) pen sensor 1154 may be implemented in the same or similar method to receiving a user's touch input or using a separate sheet for recognition. The key 1156 may, for example, include a physical button, an optical key, or a keypad. The key 1156 may apply an exemplary embodiment of any one of FIG. 4 to FIG. 10. The ultrasonic input device 1158 is a device capable of identifying data by sensing a sound wave with a microphone (e.g., the microphone 1188) in the electronic device 1100 through an input tool generating an ultrasonic signal, and enables wireless recognition. According to one exemplary embodiment, the electronic device 1100 may also receive a user input from an external device (e.g., a computer or a server) connected with the electronic device 1100 through the communication module 1120.

The display 1160 (e.g., the display 150) may include a panel 1162, a hologram device 1164, or a projector 1166. The panel 1162 may, for example, be a Liquid Crystal Display (LCD), an Active-Matrix Organic Light-Emitting Diode (AMOLED) or the like. The panel 1162 may be implemented to be flexible, transparent, or wearable. The panel 1162 may be also constructed as one module with the touch panel 1152. The hologram device 1164 may show a three-dimensional image in the air using interference of light. The projector 1166 may project light to a screen and display an image. The screen may be, for example, located inside or outside the electronic device 1100. According to one exemplary embodiment, the display 1160 may further include a control circuit for controlling the panel 1162, the hologram device 1164, or the projector 1166.

The interface 1170 may, for example, include a HDMI 1172, a USB 1174, an optical interface 1176, or a D-sub-miniature (D-sub) 1178. The interface 1170 may be, for example, included in the communication interface 170 illustrated in FIG. 1. Additionally or alternatively, the interface 1170 may, for example, include a Mobile High-Definition Link (MHL) interface, a Secure Digital (SD) card/Multi Media Card (MMC) interface or an Infrared Data Association (IrDA) standard interface.

The audio module 1180 may convert a voice and an electric signal interactively. At least some constituent elements of the audio module 1180 may be, for example, included in the input/output interface 140 illustrated in FIG. 1. The audio module 1180 may, for example, process sound information inputted or outputted through a speaker 1182, a receiver 1184, an earphone 1186, the microphone 1188, and/or the like.

The camera module 1191 is a device able to take a still picture and a moving picture. According to one exemplary embodiment, the camera module 1191 may include one or more image sensors (e.g., a front lens or rear lens), a lens (not shown), an Image Signal Processor (ISP) (not shown), and/or a flash (not shown) (e.g., an LED or a xenon lamp).

The power management module 1195 may manage electric power of the electronic device 1100. Though not illustrated, the power management module 1195 may, for example, include a Power Management Integrated Circuit (PMIC), a charger IC, or a battery or fuel gauge.

The PMIC may be, for example, mounted within an integrated circuit or a SoC semiconductor. A charging method may be divided into a wired charging method and a wireless charging method. The charger IC may charge the battery 1196, and may prevent the introduction of overvoltage or overcurrent from an electric charger. According to one exemplary embodiment, the charger IC may include a charger IC for at least one of the wired charging method or the wireless charging method. The wireless charging method may, for example, be a magnetic resonance method, a magnetic induction method, an electromagnetic wave method, or the like. A supplementary circuit for wireless charging, for example, a circuit such as a coil loop, a resonance circuit, a rectifier or the like may be added.

The battery or fuel gauge may, for example, measure a level of the battery 1196, a charging voltage thereof, a charging current thereof, or a charging temperature thereof. The battery 1196 may generate or store electricity, and supply power to the electronic device 1100 using the stored or generated electricity. The battery 1196 may, for example, include a rechargeable battery or a solar battery.

The indicator 1197 may display a specific status of the electronic device 1100 or a part (e.g., the AP 1110) thereof, for example a booting state, a message state, a charging state or the like. The motor 1199 may convert an electric signal into a mechanical vibration. Though not illustrated, the electronic device 1100 may include a processing device (e.g., a GPU) for mobile TV support. The processing device for mobile TV support may, for example, process media data according to the standards of Digital Multimedia Broadcasting (DMB), Digital Video Broadcasting (DVB), a media flow or the like.

Embodiments of the present disclosure may improve the assembly of an electronic device and make the electronic device slim, because having a simple instrument coupling structure.

Each of the aforementioned constituent elements of the electronic device according to one exemplary embodiment of the present disclosure may include one or more components, and a name of the corresponding constituent element may be different in accordance to the kind of electronic device. An electronic device according to one exemplary embodiment of the present disclosure may include at least one of the aforementioned constituent elements, and may omit some constituent elements or further include additional other constituent elements. Also, some of the constituent elements of the electronic device according to one exemplary embodiment of the present disclosure are combined to form one entity, thereby identically performing the functions of the corresponding constituent elements before combination.

The term "module" used in the present disclosure may, for example, represent a unit including one of hardware, software, and firmware or a combination of two or more of them. The "module" may be, for example, used interchangeably with the terms "unit", "logic", "logical block", "component", "circuit" or the like. The "module" may be also the minimum unit of an integrally constructed component or a part thereof. The "module" may be also the minimum unit performing one or more functions or a part thereof. The "module" may be implemented mechanically or electronically. For example, the "module" according to one exemplary embodiment of the present disclosure may include at least one of an Application-Specific Integrated Circuit (ASIC) chip, Field-Programmable Gate Arrays (FPGAs) or a programmable logic device performing some operations, well known to the art or to be developed in the future.

According to one exemplary embodiment, at least part of an apparatus (e.g., modules or functions thereof) or method (e.g., operations) according to one exemplary embodiment of the present disclosure may be, for example, implemented by an instruction stored in a computer-readable storage media in a form of a programming module. In a case where the instruction is executed by one or more processors (e.g., the processor 120), the one or more processors may perform functions corresponding to the instructions. The computer-readable storage media may be, for example, the memory 130. At least part of the programming module may be, for example, implemented (e.g., executed) by the processor 120. At least part of the programming module may include, for example, modules, programs, routines, set of instructions, processes or the like for performing one or more functions.

The computer-readable recording media may include a magnetic media such as a hard disk, a floppy disk, and a magnetic tape, an optical media such as a Compact Disc-Read Only Memory (CD-ROM) and a Digital Versatile Disc (DVD), a Magneto-Optical Media such as a floptical disk, and a hardware device configured to store and perform a program instruction (e.g., the programming module) such as a Read Only Memory (ROM), a Random Access Memory (RAM), a flash memory and the like. Also, the program instruction may include not only a mechanical code such as a code made by a compiler but also a high-level language code executable by a computer using an interpreter and the like. The aforementioned hardware device may be configured to operate as one or more software modules in order to perform an operation of one exemplary embodiment of the present disclosure, and vice versa.

The module or the programming module according to an embodiment of the present disclosure may include at least one or more of the aforementioned constituent elements, or omit some of the aforementioned constituent elements, or further include additional other constituent elements. Operations carried out by the module, the programming module or the other constituent elements according to one exemplary embodiment of the present disclosure may be executed in a sequential, parallel, repeated or heuristic method. Also, some operations may be executed in different order or may be omitted, or other operations may be added.

Embodiments of the present disclosure disclosed in the present specification and drawings merely suggest specific examples so as to easily describe the technological content according to an embodiment of the present disclosure and help the understanding of the embodiment of the present disclosure, and do not intend to limit the spirit and scope of the exemplary embodiment of the present disclosure. Accordingly, it should be understood that the scope of the embodiments of the present disclosure includes all modified or deformed forms drawn on the basis of the technological spirit of the exemplary embodiment of the present disclosure besides the embodiments disclosed herein.

What is claimed is:

1. An electronic device comprising:
a window;
a circuit board including a switch mounted thereon;
a display panel disposed between the window and the circuit board, wherein the window includes a first area being overlapped with a screen of the display panel and a second area not being overlapped with the screen of the display panel; and
a button body disposed between the second area of the window and the circuit board,
wherein the button body includes a button including a part disposed in a hole formed in the second area of the window, a support part surrounding the button, and a pair of connection parts that extend from both sides of the button and are coupled to the support part.

2. The electronic device of claim 1, further comprising:
a substantially concave housing including:
a first part wherein the circuit board is disposed between the first part and the display panel, and
a ring-shaped second part extended from the first part to enclose the window, the display panel, the circuit board and the button body.

3. The electronic device of claim 2, further comprising:
at least one first bolt hole formed in the support part of the button body;
at least one second bolt hole formed in the circuit board, wherein the least one second bolt hole is aligned with the at least one first bolt hole in a direction from the window to the circuit board; and
at least one boss formed in the first part of the housing, wherein the at least one boss is aligned with the at least one second bolt hole in the direction from the window to the circuit board,
wherein, when a bolt is coupled to the boss through the first bolt hole and second bolt hole, both the button body and the circuit board are coupled to the housing.

4. The electronic device of claim 2, further comprising:
a socket mounted on an edge area of the circuit board, and disposed between the first part of the housing and the circuit board; and
a second hole formed in the second part of the housing, wherein the socket is aligned with the button body in a direction from the window to the circuit board, and wherein an external electronic device is connected with the socket via the second hole.

5. The electronic device of claim 4, wherein the socket includes a Universal Serial Bus (USB) connector.

6. The electronic device of claim 2, further comprising:
a second hole formed in the second area of the window; and
a receiver mounted on the first part of the housing, disposed between the window and the circuit board, and outputting a sound based on a received electrical signal, and
wherein the first area of the window is rectangle,
wherein the first and second holes are respectively disposed near two opposing sides of the first area,
wherein the second hole is aligned with the receiver in a direction from the window to the circuit board, and
wherein the sound from the receiver is output external to the electronic device via the second hole.

7. The electronic device of claim 6, wherein the circuit board does not extend into a space between the second hole and the receiver.

8. The electronic device of claim 6, further comprising:
a socket mounted on an edge area of the circuit board, and disposed between the first part of the housing and the circuit; and
a third hole formed in the second part of the housing,
wherein the socket is adjacent the receiver, and
wherein an external connector is connected with the socket via the third hole.

9. The electronic device of claim 8, wherein the second part of the housing further comprises a protrusion covering an edge of the circuit board,
wherein the edge of the circuit board is disposed between the protrusion and the circuit board, and
wherein the socket is mounted by the edge of the circuit board.

10. The electronic device of claim 9, wherein the socket includes an earjack.

11. The electronic device of claim 2, further comprising a flat shield can disposed between the circuit board and the first part of the housing.

12. The electronic device of claim 2, wherein the housing further comprises a cover detachable to/from the first part of the housing, and
wherein the display panel, the circuit board, the button body, and the first part of the housing are disposed between the window and the cover.

13. The electronic device of claim 12, further comprising:
an opening formed in the first part of the housing; and
a battery pack disposed in the opening,
wherein, when the cover is separated from the first part of the housing, the battery pack is detachable to/from the opening of the housing.

14. The electronic device of claim 1,
wherein the pair of connection parts are elastically deformable to deflect movement of the button toward the circuit board to contact the switch when the button is pressed.

* * * * *